Patented Oct. 3, 1950

2,524,080

UNITED STATES PATENT OFFICE 2,524,080

PRODUCTION OF ROOM TEMPERATURE SETTING RESINOUS PHENOLIC COMPOSITIONS

Philip H. Rhodes, Kingston, N. Y., assignor, by mesne assignments, to Koppers Company, Inc., a corporation of Delaware No Drawing. Application August 14, 1946, Serial No. 690,608

21 Claims. (Cl. 260—19)

The present invention relates to the production of a composition containing a resinous product made by reacting a polyhydric benzene as for example a trihydroxy or a dihydroxy benzene with a material selected from the group consisting of unsaturated fatty oils and unsaturated fatty acids, said reaction being preferably carried out in the presence of a catalyst. The so-produced resinous reaction product is dissolved in an organic solvent and then converted to a state in which it is capable of cold setting in the presence of an aldehydic setting agent by adding to said solution a converting agent selected from the group consisting of acid and alkaline materials. Thereafter there is mixed with the so-formed reaction mass just prior to its use a setting agent including an aldehydric agent in a quantity sufficient to harden the resinous body, and the resulting mass may then be cold set at a temperature varying between about 40° F. and about 120° F. within a period of 24 hours to a non-tacky dry infusible state. Usually a film of the material will cure or set within a period of 24 hours to a non-tacky dry infusible state. While the phenolic body may be a dihydroxy benzene such as resorcinol, it may also be a trihydroxy benzene such as phloroglucinol, or the phenolic body may be a mixture of phenolic bodies such as a mixture of a monohydric phenol and a dihydric phenol or a mixture of a dihydric phenol and a trihydric phenol, or a mixture of a monohydric phenol, a dihydric phenol, and a trihydric phenol, said ingredients being present in the mixture in any desired proportion, the proportions not being critical.

While the catalyst which is used may be any prior art catalyst hitherto used in producing reaction products or condensation products of phenols and unsaturated fatty acids, it is preferred that the catalyst be sulfuric acid.

When an acid catalyst is used the resinous solution may be converted to a cold setting state by adding thereto an alkaline converting agent in an amount which will convert the resinous solution to an alkaline state, said converting agent functioning also in the broad form of the invention to neutralize the residual acid present in the reaction product of the phenolic body and the unsaturated fatty oil or fatty acid and, in addition converts the solution over past the neutrality point so that the resinous solution will cold set at a temperature varying between 40° F. and 120° F. In other words, the converting agent adjusts the basicity of the resinous reaction product in solution so that it will cold set within a predetermined length of time, as more particularly hereinafter pointed out. Instead of neutralizing and adjusting the basicity of the resinous composition in one step this may be carried out in two steps, the first step comprising adding a neutralizing agent to neutralize the residual acidity present in the reaction product or the solution thereof, said neutralizing agent being substantially inert towards the dissolved resinous body.

Thereafter there is added to the reaction product of the phenolic body and the unsaturated fatty oil or unsaturated fatty acid a setting agent in an amount sufficient to set the resinous reaction product, said setting agent being in the preferred form of the invention a formaldehyde-liberating agent. Where the phenolic body which is reacted with the unsaturated fatty acid or unsaturated fatty oil is a dihydroxy benzene, the amount of the setting agent, as for example formaldehyde, used to set the reaction product should be present in a molar ratio of at least 0.8 of the formaldehyde to 1 of the dihyroxy benzene. Of course, a greater ratio may be used. When a mixture of phenols is condensed with an unsaturated fatty acid or an unsaturated fatty oil, the ratio of the setting agent, as for example formaldehyde, to the total phenolic body should be at least 0.8:1.

While the dihydroxy benzene is preferably resorcinol, other dihydroxy benzenes such as catechol or hydroquinone may be condensed with the fatty oils or the fatty acids and the reaction product treated as herein set forth, it being recognized that catechol and hydroquinone are slower reacting than resorcinol. In one form of the invention the resinous reaction product is made by reacting a dihydroxy benzene with unsaturated fatty oils, as for example cotton seed oil or soya bean oil, the latter being examples of vegetable oils containing between 40% and 60% trilinolein calculated on the basis of the total fatty acid as 100% and not as glycerides.

It has been proposed to prepare a coating composition by reacting phenol, tung oil and phosphoric acid at reflux temperature for a period of time varying from one-half hour to six hours, after which there is added to the mass dry hexamethylene tetramine. The resulting product after further heat treating and stabilization is applied to a base material, and thereafter baked at temperatures varying from 160° to 170° C. The present invention distinguishes therefrom by cold setting the resinous product at temperatures varying between about 40° and 120° F. within a period of twelve hours to a non-tacky dry state. Further, in the preferred form of the present invention, the aldehyde setting agent is added to the resinous reaction product just prior to the use of the said resinous product.

It has also been proposed to react phenol and tung oil in the presence of aluminum chloride to which there is added aqueous formaldehyde, and the mixture is then cooked. However, in spite of the formaldehyde which has been cooked in the non-reactive resinous product that is formed, the product of the present invention upon the addition of a setting agent such as an aldehyde setting agent or a setting agent containing a reactive methylene radical becomes highly reactive. Further, the present invention distinguishes from the recited prior art by the step of cold setting the resinous product.

It has also been proposed to react phenol, tung oil and phosphoric acid, add hexamethylene tetramine, and then heat-react the product. In accordance with the present invention, the resinous composition containing the setting agent is not heat-reacted, but is cold set, following the addition of the setting agent just prior to use of the final resinous composition. Stated differently, the composition of the present invention which is admirably adapted for coating various base materials, is applied in a liquid uncured form, and then cured at room temperatures.

The primary object of the present invention is to produce a non-siccative room temperature setting composition by heat reacting a phenolic body and a material selected from the group consisting of unsaturated fatty oils and unsaturated fatty acids, said reaction being preferably carried out in the presence of a catalyst, forming a resin solution therefrom which is capable of cold setting, and then cold setting the resulting reaction product in the presence of a setting agent at a temperature varying between about 40° F. and about 120° F. within a predetermined period of time to a non-tacky dry state.

It is a further object of the invention to produce a composition of the character above set forth in which there is utilized as a setting agent the reaction product of an organic amine and an aldehyde, said reaction product in one form of the invention also acting as a converting agent to confer upon the resinous reaction product of the polyhydroxy benzene and the fatty oil or fatty acid, cold setting properties.

Another object of the present invention is to set permanently fusible polyhydroxy benzene-aldehyde resin products with the reaction product of an organic amine and an aldehyde.

A further object of the present invention is to set permanently fusible copolymer dihydroxy benzene-aldehyde, monohydroxy phenol-aldehyde resins with a setting agent comprising the reaction product of an organic amine and an aldehyde.

It is a further object of the present invention to provide liquid sprayable reaction products of the character above set forth in which there is incorporated a material which simultaneously converts the resinous solution to a cold setting state and sets the reaction product, said material by virtue of its low or meagre volatility or, stated differently, its boiling point, remains in the resinous solution during spraying and after the solution impinges upon the surface being sprayed.

It is a further object of the present invention to provide a non-siccative cold setting resinous composition comprising a mixture of a solution in an organic solvent of a resinous reaction product of a reactive phenolic body and an unsaturated material selected from the group consisting of unsaturated fatty oils and unsaturated fatty acids and an acid catalytic agent; and a setting agent comprising the reaction product of a reactive amine selected from the group consisting of reactive primary and secondary aliphatic and alicyclic amines, and a reactive aldehyde, said setting agent being present in a quantity which sets said resinous reaction product. Preferably the organic solution is a neutralized solution, and by that is meant that the residual acid catalyst not used up in the reaction is neutralized. In this manner the setting agent can perform the setting function without any of the material being used as a neutralizing agent.

In the best form of the invention the unsaturated fatty oils and unsaturated fatty acids contain broadly 12 to 32 carbon atoms in a molecule and preferably 12 to 24 carbon atoms in a molecule. The reactive aldehyde may be any prior art aliphatic or aromatic aldehyde.

A further object of the present invention is to provide a non-siccative cold setting resinous composition comprising a mixture of a solution in an organic solvent of the resinous reaction product of a reactive phenolic body, an unsaturated material selected from the group consisting of unsaturated fatty oils and unsaturated fatty acids, an acid catalytic agent; a converting agent selected from the group consisting of acid and alkaline converting agents which will convert said solution of the resinous composition to a state in which it is capable of cold setting in the presence of a setting agent, and a reactive aldehyde including an aldehyde-liberating setting agent in a quantity which sets said resinous reaction product. Preferably the amount of converting agent is 1% to 20% taken on the weight of the resin solids present in the solution of the resin.

In order that the invention may be clearly understood, the following examples are set forth as illustrative and not by way of limitation.

*Example I*

A mixture is made up of the following ingredients in the proportions specified:

| | Grams |
|---|---|
| Resorcinol | 1000 |
| Soya bean oil | 2000 |
| Sulfuric acid | 100 |

The above ingredients are mixed together at room temperature, that is, at a temperature varying between 20° C. and 30° C. and thereafter warmed until the mixture gradually becomes a substantially homogeneous liquid. Warming is continued until exothermic reaction sets in. Usually it is sufficient to warm or heat the homogeneous liquid to a temperature varying from about 120° C. to 130° C. at which point the exothermic reaction is initiated. Usually the exothermic reaction will carry the temperature up to between about 135° C. and 150° C.

It is desired to point out that the reaction is accompanied by an evolution of sulfur dioxide, and the evolution of this gas is one of the evidences of the extent of the reaction. It is desirable that the reaction proceed until the evolution of $SO_2$ is substantially completed, and usually the evolution will be substantially completed if the reacting mass is heated to a temperature varying from about 175° C. to about 200° C. Active heating of the mass is then stopped, and the reaction product is then cooled but not sufficiently to congeal the mass. It is preferred to keep it in a molten condition in order that its solution in the solvent medium will be facilitated, and this may be accomplished by cooling to around 110° C., although this may be greatly varied and still come within the spirit of the present invention.

It has been ascertained that the heating to a range of 175° C. to 200° C. does not completely remove the sulfuric acid which was originally added to the resinous reactants. This residual acidity has a deteriorating influence on cellulosic material and therefore it is desirable to neutralize the same when the reaction product is used in conjunction with cellulosic material. This neutralization may be separately effected or the neutralization may be effected by adding to the resinous reaction product a formaldehyde-liberating setting agent in conjunction with an organic base which will function both to neutralize the residual acidity of the resinous reaction product and to vary the time required for the resinous reaction product in the presence of a setting agent to cure.

In the above specific example, there may be added to the resulting resinous reaction product 154 grams of tri-ethanol amine which is the amount of basic neutralizing agent which will approximately neutralize the residual acid as determined by difference from the SO₂ liberated.

In one form of the invention a greater amount of neutralizing agent may be added than is necessary to neutralize the residual acid present in the resinous condensation product produced from the condensation of a dihydroxy benzene and an unsaturated fatty oil as herein specifically set forth. The neutralizing agent also functions as an alkaline modifying agent which converts the resinous reaction product of the dihydroxy benzene, as for example, resorcinal and the unsaturated fatty oil, as for example, soya bean oil or cottonseed oil, into a product which in the presence of a setting agent cold sets at a temperature varying from about 60° F. to about 110° F. to a tack-free state when brushed on a glass plate in a thickness up to three mils and within a time period of less than 12 hours and in some instances less than 24 hours. The time of setting may vary from one minute to twenty-four hours and preferably from 1 minute to 12 hours, depending upon the particular resin used, the setting agent used, the converting agent used, and other chemical and physical factors.

To the neutralized resinous reaction product of resorcinol and soya bean oil there may be added an organic solvent medium to form a coating solution provided the cold setting resinous reaction product is to be used for coating purposes, it being recognized that the cold setting reaction product of resorcinol and soya bean oil may be used for other purposes, as for example, laminating or as an adhesive or in other forms. As far as the cold setting of the reaction product is concerned, it is not material for what application the reaction product is used.

While various organic solvents may be added as hereinafter more specifically set forth, a desirable solvent is commercial isopropyl alcohol or commercial solvent alcohol. The above batch will produce about 3000 grams of resorcinol-soya bean resinous reaction product, and this may be dissolved in about 3000 grams of solvent to form a coating solution of low viscosity.

The organic solution of the resinous reaction product is approximately neutral, and in this state will not be converted at temperatures ranging from 60° F. to about 100° F. or 110° F. into a cured film upon the addition of a setting agent in less than twenty-four hours unless an acid or alkaline converting agent is added, but preferably an alkaline converting agent, since most materials are damaged by acid solutions. The amount of alkaline-converting agent that is added will be determined in accordance with the time of set desired. For example, in order to have the so prepared resinous coating composition cold set or dry to a tack-free state within a period of two hours when applied to a solid surface, as for example a ship or an automobile body, there may be added thereto an organic amine, as for example an aliphatic amine or an alicyclic amine. The amount of converting agent added will determine the time in which the film of the resinous condensation product of the dihydroxy benzene and the unsaturated fatty oil will set in the presence of a setting agent at a temperature varying from about 60° F. to about 110° F., the preferred range being 75° F. to 90° F. Preferably, there is added to the 6000 grams of the solution about 60 grams of ethylene diamine. This is about 2% taken on the weight of the resinous reaction product present in the solution. If 1000 grams of resorcin is condensed with 2000 grams of soya bean oil, then about 3000 grams of resinous reaction condensation product is produced. Roughly, the amount of converting agent that is used may vary from about 1% to about 20% based on the resin solids present in the coating composition which in the present example is 3000 grams.

To the resulting solution of resinous reaction product characterized by the property of setting in the presence of a setting agent at a temperature varying from 60° F. to 110° F. in less than 25 hours there is added a 37% solution of formaldehyde in any of the prior art formaldehyde solvents, including ethyl alcohol, isopropyl alcohol, ethylene glycol, and the like. Although an aqueous solution of formaldehyde may be used, under most circumstances it is preferred to use an alcoholic solution of formaldehyde or any equivalent thereof which liberates a reactive aldehyde. The ethylene diamine which has been set forth in this example as a converting agent is merely illustrative and is not intended to limit the present invention to this particular organic amine. Other organic amines which may be used as alkaline converting agents are triethylene tetramine, propylene diamine, mono ethanol amine, cyclohexanol amine, tetraethylenepentamine, and the like. In general, primary or secondary aliphatic mono, di, or poly amines, or alicyclic mono, di, or poly amines may be used. When using ethylene diamine as an alkaline converting agent about 2% is desirable based on the weight of the resin solids in the neutralized solvent solution of the resin. When the resinous reaction product formed by reacting the dihydroxy benzene with the unsaturated fatty oil, after neutralization, is treated with an alkaline converting agent comprising diethylene triamine, about 4% of the latter will give satisfactory results so that the product will set in the presence of a setting agent at temperatures ranging from about 60° F. to about 110° F. within about twenty-four hours and preferably within twelve hours to a tack-free infusible state.

In general, the amount of alkaline converting agent used depends upon its molecular weight and its basicity. Thus, for example 2% of ethylene diamine based on the resin solids in the resin solution will provide a composition which will set within two hours when sufficient formaldehyde dissolved in commercial solvent alcohol is added, whereas nearly twice the amount of hexamethylenediamine is required to effect the same rate of cure, inasmuch as the molecular weight of hexamethylenediamine is approximately twice that of ethylene diamine, and both are diamines.

In the above example the neutralized and converted resinous composition of resorcinol and soya bean oil is set with a formaldehyde-liberating setting agent. Instead of using formaldehyde, other saturated and unsaturated prior art aliphatic and aromatic aldehydes may be used, as for example crotonal, acrolein, and furfural. The above are all aldehydes. Additional examples of aldehydes are benzaldehyde, butyraldehyde, propionaldehyde, and cyclohexylaldehyde. The latter is an example of an alicyclic aldehyde. Other alicyclic aldehydes may be used. Dialdehydes, as for example glyoxal, may also be used.

When it is desired to spray a cold setting resinous composition of a dihydroxy benzene, as for example, resorcinol and an unsaturated fatty oil, as for example soya bean oil or cotton seed oil, or any of the other fatty oils or fatty acids herein set forth, it is necessary to mix the neutralized alkaline modified cold settable resin solution prepared as above set forth with the setting agent. If the setting agent is present in the sprayable resin solution as a gas or a low boiling point material, then the setting agent evaporates from the resin solution being sprayed during the period of application of the spray to the body which it is desired to coat and, therefore, fails or inefficiently functions as the setting agent. In order to overcome this difficulty, in accordance with the present invention the aldehydes which in themselves may function as setting agents, but which incorporated in the resin solution are too volatile to remain in solution during the application of the spray, may be reacted with aliphatic or alicyclic amines to form amine-aldehyde addition compounds which products have low vapor pressure, that is a vapor pressure below 0.5 mm. at 20° C., which property allows said compounds to impinge upon the sprayed surface in conjunction with the resin solids and thereby permits their serving and functioning as setting agents.

The following is an example of the preparation of a sprayable liquid cold setting composition comprising the resinous reaction product of resorcin and cotton seed oil, triethanol amine, a difunctional setting converting agent, comprising the reaction product of two mols of formaldehyde and one mol of ethylenediamine, and an organic solvent medium. The triethanol amine functions as a neutralizing agent, and the addition product of formaldehyde and ethylenediamine functions as the combined converting and setting agent.

*Example II*

A mixture is made of the following ingredients in the proportions specified:

| | Grams |
|---|---|
| Resorcinol | 1000 |
| Cotton seed oil | 1000 |
| Sulfuric acid | 100 |

The above ingredients are mixed together at room temperature, that is, at a temperature varying between 20° C. and 30° C. and then heated slightly until an exothermic reaction occurs to thereby raise the temperature of the mass which may be as high as 170° C. to about 175° C. This temperature is maintained until the resorcinol is substantially reacted with the cotton seed oil. For the batch above set forth the period is about one hour. The resulting resinous composition is then heated for an additional 1½ hours until a temperature of 200° C. is obtained at which temperature the evolution of sulfur dioxide has ceased. If the resinous reaction mass is heated substantially higher than 200° C. for a sufficient period of time there is a tendency for the resin to be converted into a rubbery mass in which form it cannot be dissolved. However, the resinous composition prepared as herein set forth from resorcinol and the fatty oil or fatty acid in the presence of an acid reaction catalyst has present a certain amount of residual acid.

Neutralization of the resinous reaction product is preferable, and in the present example this is accomplished by adding to 2000 grams of the reaction product about 154 grams of triethanol amine. Thereafter, the neutralized reaction product of the resorcinol and the cotton seed oil is dissolved in about 2000 grams of a suitable solvent, as for example toluene. This solution cannot be made to cold set on the mere addition of a setting agent including any of the monofunctional setting agents herein set forth. In order for the solution of the resinous reaction product to cold set at temperatures below 110° F. or 120° F., it is necessary to add to the resin solution a combined modifying and setting agent, as for example 500 grams of the addition product of 1 molecular proportion of ethylenediamine and 2 molecular proportions of formaldehyde, said addition product being an oil. The resulting mass when sprayed on a surface will cold cure at temperatures varying between 60° F. and 110° F. in about two hours to a tack-free state.

Instead of using the addition product of ethylene diamine and formaldehyde, the following addition products may be used:

The addition product of formaldehyde and mono, di, or poly aliphatic or alicyclic amines, as for example propylene diamine, tetramethylene diamine, pentamethylenediamine, hexamethylenediamine, propyl amine, butyl amine, amyl amine, cyclohexyl amine, diethylene triamine, triethylene tetramine, tetraethylenepentamine, and the like. In general, it may be stated that the combined converting and setting agent may be an addition product of a primary or secondary amine and an aldehyde. A primary or secondary amine is represented by the formula R—N—R′ (H) and may be illustrated by methylamine, ethylamine, propylamine, cyclohexylamine, diethylamine, dipropyl amine, and the like, and the aldehyde may be any aldehyde, such as formaldehyde, acetaldehyde, propionaldehyde, furfuraldehyde, crotonal, acrolein, or benzaldehyde.

The addition product is illustrated by the structural formula RNR′ (CHOHR″) where either R, R′ or R″ is selected from the group of radicals consisting of aliphatic or alicyclic radicals, illustrative examples of which have been given above, or hydrogen, at least one only of said radicals being hydrogen. However, the invention is not limited to these examples and R′ or R″ may be any organic radical. The diamines which are used to react with aldehydes are represented by the structural formula $$(RR')N—R''—N—(R'''R'''')$$

Where R″ is an alkylene radical, as for example ethylene, propylene, cyclohexylene and the like, R, R′, R‴, and R⁗ may be any organic radical or hydrogen, but at least two must be hydrogen in order for the derivative to function as a diamine derivative. In addition the reaction products of the aldehydes previously set forth with the alkylene polyamines may be used. Said alkylene polyamines are represented by the structural formula

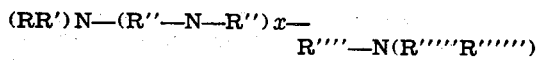

where R, R', R'''''', and R''''''' may be any organic radical or hydrogen, but two of said groups must be hydrogen, R'', and R''' may be an alkylene or cycloalkylene group. R''' must be hydrogen when $x=1$, but where $x$ is greater than 1 there must be at least one hydrogen atom for R''', the remainder may be any organic radical.

In the preferred form of the present invention the amount of the dihydroxy benzene, as for example, resorcinol or catechol or hydroquinone which is reacted with the unsaturated fatty oil or fatty acid varies by weight from one part of the oil of the fatty acid to three parts of the resorcinol to one part of the resorcinol to three parts of the oil or fatty acid. In Example I the ratio is one part of the resorcinol to two parts of the soya bean oil, and in Example II the ratio is one part of the resorcinol to one part of the soya bean oil.

Tests show that where the ratio of the resorcinol to oil is 1:3 or 3:1 the reaction products are not entirely satisfactory from the standpoint of flexibility and toughness, but for some purposes said products may be used. Better results are obtained when the ratio of the dihydroxy benzene such as resorcinol, catechol, or hydroquinone to the oil or unsaturated fatty acid vary from 1:2 to 2:1.

In Example I the reaction product of the dihydroxy benzene and the fatty oils such as a vegetable oil or an animal oil and, more particularly, soya bean oil, is after solution converted to the cold setting state by first adding an alkaline modifying or converting agent and then a setting agent is added which has the simple function of setting the resin solution.

In Example II the separate step of adding an alkaline converting agent after neutralization is omitted, and in lieu thereof the resin solution is treated with a combined alkaline converting and setting agent. It is within the province of the present invention to modify the second example so as to convert the resin solution by treatment after neutralization with an alkaline converting agent and then add a difunctional converting and setting agent which increases the basicity of the resin composition and consequently reduces the setting time.

The ethylene diamine addition product of formaldehyde referred to in Example II may be prepared as follows:

600 grams of ethylene diamine supplied as 880 grams of 68% solution are mixed with 300 grams of petroleum naphtha in a reaction vessel equipped with a mechanical stirrer. 600 grams of paraform are mixed in a slurry with 600 grams of petroleum naphtha and placed in a large separatory funnel equipped with a mechanical stirrer. Both mixtures are preferably kept in a constant state of agitation by means of mechanical stirrers. The vessel containing the ethylene diamine is herein termed the reaction vessel. The reaction vessel is surrounded by a bath of acetone and solid carbon dioxide or any prior art cooling means are furnished which function to maintain the temperature of the reaction ingredients in the reaction vessel between $-10$ and $+10°$ C. The reaction vessel is cooled to prevent the polymerization of the reaction product to the state where it becomes infusible and insoluble since in such a state the product no longer functions as a setting agent. A cooling bath also functions to remove the heat of reaction thereby allowing more rapid addition of the reactive ingredients. This may be obtained by reacting at room temperature, but the reaction proceeds so slowly that it is not practical.

The slurry of paraform in a non-reactive non-solvent which is illustrated by petroleum naphtha is added slowly, and care is taken that the temperature does not rise above the polymerization point of the reaction product, 10° C. being about the upper limit. It is equally important, however, that the temperature of the reactants does not drop below $-10°$ C. or the ethylene diamine will freeze. If the diamine freezes, this will prevent the reaction of the diamine with the aldehyde. While $-10°$ is the lower temperature when working with ethylene diamine, when using other amines of the type previously described, the temperature will vary. The point is that the temperature of the reaction mixture should be maintained above the freezing point of the amine and below the polymerization point of the amine-aldehyde reaction product.

It may be pointed out that as the temperature is increased above the critical temperature for the reaction, the addition of the aldehyde becomes a rather precarious operation, inasmuch as an exothermic reaction results, and this leads to partial polymerization of the reaction product, this reaction product being an aldolamine. When the ethylene diamine and the paraform are reacted in the proportions above set forth, the product may be specifically designated as dimethylol ethylene diamine.

The addition of the formaldehyde as paraform to ethylene diamine in the molecular proportions of two mols of formaldehyde to one mol of ethylene diamine to produce the dimethylol ethylene diamine requires approximately 1½ to 2 hours. Obviously, this time will vary depending on the amounts of the reactants used and other operating variables.

Instead of reacting 2 mols of formaldehyde with 1 mol of ethylene diamine, 1, 3, or 4 mols, respectively, of formaldehyde may be reacted with 1 mol of ethylene diamine to produce, respectively, mono methylol ethylene diamine, trimethylol ethylene diamine, and tetramethylol ethylene diamine.

After the slurry of paraform has been added and reacted the reaction liquor is allowed to stand for a substantial length of time so that the methylol ethylene diamine reaction product will separate as a lower layer from the reaction suspension medium in which the reaction is carried out. The methylol ethylene diamine having a greater specific gravity than the petroleum naphtha separates as a lower layer. Usually the reaction mixture is allowed to stand for about five hours, but obviously this period of standing or quiescence will vary in accordance with the quantity of the ingredients and operating conditions. The lower layer may be run off leaving the petroleum naphtha containing from 3% to 6% of the methylol amine. The latter may be recovered by placing the petroleum naphtha containing this residual amount of methylol amine in a settling vessel for a predetermined period until the methylol amine separates out. Thereafter the residual petroleum naphtha may be re-used in the operation.

Instead of employing the above method of separation the dimethylol ethylene amine may be separated from the petroleum suspension medium by a centrifugal separator.

One of the functions of the suspending or dispersing medium is to assist in preventing polymerization of the reaction product by dispelling the heat of reaction through the mechanism of providing a plurality of separate micro reactions rather than one concentrated mass reaction.

Instead of using petroleum naphtha the following may be used:

"White oil," carbon tetrachloride, ethylene chloride, chloroform, toluene, benzene, xylene, gasoline, or any organic liquid in which the reactants are insoluble and in which the reaction product is insoluble.

Dimethylol diethylene triamine may be produced by reacting 619 grams of diethylene triamine in 300 grams of petroleum naphtha with 360 grams of paraform suspended in 360 grams of petroleum naphtha. The resulting product is an oily liquid which may be used in the present process as a combined alkaline modifying agent and setting agent.

Difurfural ethylene diamine is produced by reacting 600 grams of ethylene diamine suspended in 300 grams of petroleum naphtha with 960 grams of furfural suspended in 960 grams of petroleum naphtha. Monomethylolaminoethanolamine which is an oily liquid is produced by reacting 624 grams of aminoethylethanolamine suspended in 300 grams of petroleum naphtha with 180 grams of paraform suspended in 180 grams of petroleum naphtha.

In all the above examples the procedure is the same as set forth in the preparation of the addition product of ethylene diamine and formaldehyde.

In all of the above examples the various aliphatic or alicyclic amines of the character herein previously referred to may be reacted with any of the aldehydes herein referred to to produce a combined alkaline converting agent and setting agent functioning to convert and cold-set at temperatures between 60° F. and 110° F. the resinous reaction product of the dihydroxy benzene and the vegetable and animal fatty oils herein set forth.

For the purposes of the present invention the term monohydric or polyhydric phenol includes chloro, amino, alkyl, and other derivatives, as for example, ortho, meta, and parachlorophenol, 1,3,5-dihydroxy chlorobenzene, 1,3,5-dihydroxy aminobenzene, and 1,3,5 dihydroxy methyl benzene, and ortho, meta, and para vinyl phenol. These phenols having at least two reactive positions on the nucleus unsubstituted.

It is desired to point out that the sprayable cold-setting compositions comprising the reaction product of the dihydroxy benzene and a vegetable oil which have been converted to the cold setting condition and have had added thereto a solvent and a setting agent comprising an amine-aldehyde condensation product exhibit a very strong tendency when sprayed to gel in the spray gun, and after a short time the spray gun ceases to operate. This property of speedy gelling is highly desirable in a sprayable composition of the character herein set forth because after being applied to the work piece, the coating flash dries, that is dries substantially immediately. To overcome the tendency of the cold settable composition to clog in the spray gun, it is proposed in accordance with the present invention to provide the spray gun with separate nozzles and to supply to one nozzle the composition prepared as set forth, but in which the amine-aldehyde setting agent is absent; and to separately supply to the other nozzle the amine-aldehyde condensation product in an amount which will set the composition being sprayed from the first mentioned nozzle. When this is done the cold-setting resinous composition comprising the resinous reaction product of a dihydroxy benzene and a fatty oil or fatty acid formulated as above set forth without the setting agent combines in the air and on the work piece with the setting agent comprising the amine-aldehyde condensation product, as for example, dimethylol ethylene diamine which is the reaction product of one mol of ethylene diamine and two mols of formaldehyde, and a flash setting of the resulting coating composition thereby occurs.

Instead of using dimethylol ethylene diamine the setting agent may be tetramethylol ethylene diamine resulting from the reaction of one mol of ethylene diamine with 4 mols of formaldehyde. When spraying the cold setting resin adhesive coating base which does not have the setting agent present, for every hundred grams of a 50% resin solids room temperature-setting coating resin solution sprayed from one nozzle, there should be sprayed from the other nozzle 7 grams of tetramethylol ethylene diamine setting agent in its oily liquid state, or any equivalent amount of another setting agent. The amount of setting agent will vary from about 2% to 20% taken on the weight of the resin solids present in the solution.

The coating compositions of the present invention may have present a pigmenting constituent which will affect the color of the dried coating. The thermosetting coating composition may also have present fillers or extenders such as asbestine, talc, barytes, that is, barium sulfate. These pigments and/or fillers or extenders may be acid or alkaline in character and consequently the coating composition containing the setting agent will require some adjustment in the amount of alkaline modifying agent employed.

While thermosetting compositions of the present invention have been set forth as capable of cold setting at temperatures varying between about 60° F. and 110° F. or 120° F. within a time period of 12 hours, and this is eminently desirable under some circumstances, and offers numerous advantages, it is within the province of the present invention to set the thermosetting composition at temperatures higher than 110° F. and 120° F., as for example, at temperatures varying between 120° F. and 200° F., but preferably at temperatures between about 200° F. and 300° F. The fact that the composition is on the basic side and has been adjusted to be cold-settable is also advantageous when the thermosetting resinous composition of the present invention is set at higher temperatures since the basicity or alkaline adjustment causes the setting to proceed more rapidly, and thereby provides extremely high speed commercial baking finishes.

The resinous compositions produced in accordance with Examples I and II when used as baking finishes will set and/or cure at temperatures of 200° F. to 300° F. within 1 to 5 minutes whereas the similar coating compositions which are unmodified as to alkalinity will require 15 to 20 minutes. It is desired to point out that the alkaline modification of resins of this type so speeds their rate of cure at temperatures of 200° F. to 300° F. as to adapt them to use in assembly line finishing operations employing infra red drying lamps.

While the alkaline modified resins have been set forth as the preferably coating compositions of the present invention it is desired to point out that cold setting properties are conferred on the resin compositions of the present invention by the use of acidic modifying or converting agents. However, the presence of acidic residual modifying agents in a coating composition of this character exhibits a high deteriorating influence on metallic and cellulosic as well as many synthetic materials. Therefore, in the preferred form of the present invention, the resinous coating composition is on the basic side and as such has no deteriorating influence on metals, resins, or cellulosic materials which acid components affect.

While the disclosure has specifically indicated that resins of the character exemplified by the condensation product of resorcinol and unsaturated fatty oils in the presence of a sulfuric acid catalyst are preferable, it is within the province of the present invention to employ the same reactive ingredients using other catalysts of the prior art such as other strong acids, Friedel-Crafts catalysts and the salts of weak bases and strong acids. Among the catalysts which may be used are oxalic acid, trichloroacetic acid, benzene sulfonic acid, and resorcinol sulfonic acid. The organic acids as a rule should give best results when they have a dissociation constant greater than $1 \times 10^{-3}$.

While the best results are obtained when trihydroxy or dihydroxy benzene, as for example, resorcinol, catechol, hydroquinone, orcinol, and phlorglucinol is reacted with the fatty oil or fatty acid of the character herein set forth in the presence of sulfuric acid or a catalyst supplying sulfuric acid, or a reactive sulfonic group which may be defined as $SO_2OH$, other catalysts as indicated may be used including ammonium sulfate and aluminum sulfate.

While in the specific examples given it has been indicated that it is desirable to use vegetable oils which contain a major proportion of unsaturated glycerides, said vegetable oils preferably having present about 40% to 60% trilinolein, it is recognized that the reaction product of phenolic bodies in general with other unsaturated oils, including vegetable and animal oils such as tung oil, oiticica oil, perilla oil, linseed oil, fish oils, blown castor oil, dehydrated castor oils, and in general the drying and semi-drying vegetable and animal oils may be made cold-settable by adding an acid modifying or alkali modifying agent and a setting agent of the character herein set forth including formaldehyde and amine aldehyde reaction products, and setting the resin at a temperature varying between 60° F. and 120° F. within a time period of less than 12 hours. While in the specific examples the phenolic body is a dihydroxy benzene, it is recognized that the phenolic body may be a mixture of monohydric phenols and polyhydric phenols, as for example, a mixture of monohydric phenol typified by phenol per se and a dihydric phenol typified by resorcinol; or a mixture of a monohydric phenol and trihydric phenol, the latter being typified by phlorglucinol, or the mixture of phenolic body may comprise all three kinds of phenolic entities; namely, a monohydric phenol, a dihydric phenol, and a trihydric phenol. These mixtures of phenols when reacted with a fatty oil or mixtures of fatty oils or fatty acids produce what may be termed "copolymers" reaction products. The following are illustrative of mixtures of oils which may be used:

50% soya bean oil and
50% cotton seed oil; or
33% cotton seed oil,
33% soya bean oil, and
34% menhaden oil.

The following table shows the reactivity of various setting agents which may be employed to set the room temperature coating compositions of the present invention. The table specifically indicates the length of time necessary for 100 grams of a 50% solution of a resin composition in commercial isopropyl alcohol to be set with the amount of setting agent specified in the table. It is pointed out that the amount of setting agent in each case is equivalent to 12½ grams of 37% aqueous formaldehyde solution.

TABLE I

Weights of various formaldehyde setting agents used for gelling 100 g. of a 50% solution of a soya bean oil—resorcinol resin prepared in accordance with Example I.

| Setting Agent | Weight in gms. equivalent to 12.5 gms. of 37% aqueous formaldehyde solution | Gel Time | Temp., °F. |
|---|---|---|---|
| Monomethylol Ethylenediamine | 13.8 | 5 hrs | 77.5 |
| Dimethylol Ethylenediamine | 9.2 | 45 mins | 77.5 |
| Trimethylol Ethylenediamine | 7.7 | 10 mins | 77.5 |
| Tetramethylol Ethylenediamine | 6.9 | 5 mins | 77.5 |
| Monomethylol Propylenediamine | 15.9 | 8 hrs | 77.5 |
| Dimethylol Propylenediamine | 10.3 | 4 hrs | 77.5 |
| 37% solution of formaldehyde in commercial isopropyl alcohol | 12.5 | 2 hrs | 77.5 |
| 37% solution of formaldehyde in commercial ethyl alcohol | 12.5 | 2 hrs | 77.5 |
| Paraformaldehyde plus one gram of NaOH | 4.7 | 1¾ hrs | 77.5 |
| Dimethylol Tetraethylenepentamine | 19.1 | 5 hrs | 77.5 |

It is desired to point out that the gel time in the above table is merely an index of the relative reactivity of the various setting agents above set forth and should not be confused with the setting time or with the time required for a film to set or cure to a dry non-tacky infusible insoluble state.

Referring to monomethylol ethylenediamine set forth in the above table, this is the reaction product of 1 mol of formaldehyde with one mol of ethylene diamine. 13.8 grams of this setting agent when added to 100 grams of the neutralized resin solution prepared in accordance with the example gels the mixture in 5 hours. When 9.2 grams of dimethylol ethylene diamine is added to 100 grams of the solution of Example I the gel time is 45 minutes, this setting agent being prepared by reacting 2 mols of formaldehyde with 1 mol of ethylene diamine.

When three mols of formaldehyde are reacted with one mol of ethylene diamine to produce trimethylol ethylene diamine, and 7.7 grams of the resulting trimethylol ethylene diamine are added to 100 grams of the solution of Example I, the mix will gel in ten minutes.

When four mols of formaldehyde are reacted with one mol of ethylene diamine to produce tetramethylol ethylene diamine, 6.9 grams when added to the 100 grams of the solution of Example I will gel the solution in 5 minutes.

The coating compositions of the present invention are, when cured, extremely resistant to solvents, acids, and alkalis and present moisture vapor barriers of excellent efficiency. In order to indicate the value of the coatings of the present invention as compared with some of the coatings of the prior art, balsa blocks 1 x 1 x 3 were coated with one, two, and three coats, respectively, of a standard white lead in oil paint, orange shellac, and four resinous coating compositions produced in accordance with the present invention. The 18 blocks so produced were carefully weighed and immersed in the water for 72 hours. At the end of the 72 hour immersion period they were removed, dried, and reweighed. The following table indicates the gain in weight of each specimen during the 72 hour immersion period and shows conclusively the improved resistance of the coating compositions of the present invention to penetration by moisture.

TABLE II

*Relative moisture penetrability of white paint, shellac, and resinous coatings of the present invention*

| | Per Cent Gain in Weight after 72 hour Immersion | | |
|---|---|---|---|
| | 1 coat | 2 coats | 3 coats |
| 1 White Lead in Oil Paint | 52.6 | 9.5 | 7.7 |
| 2 Orange Shellac | 39.5 | 18.1 | 10.8 |
| 3 Resinous reaction product of resorcinol and soya bean oil 50% resin in toluene+12.5 g. isopropanol formaldehyde per 100 g. of solution | 32.2 | 5.9 | 3.0 |
| 4 50% resorcinol soya bean oil resin solution in toluene+9.2 g. dimethylol ethylene diamine per 100 g. solution | 33.6 | 9.6 | 4.8 |
| 5 50% resorcinol cotton seed oil resin solution in toluene+12.5 g. isopropanol formaldehyde per 100 g. of solution | 34.4 | 6.3 | 1.7 |
| 6 50% resorcinol cotton seed oil resin solution in toluene+9.2 g. dimethylol ethylene diamine per 100 g. of solution | 25.0 | 6.2 | 1.5 |

The gain in weight of the specimens having had three coats of the coating under consideration will be examined to point out the value of the respective types of coating. The white lead painted block showed a gain in weight of 7.7%, and the shellacked block showed a gain in weight of 10.8%; whereas the highest value for any of the resin coatings was only 4.8%, and the lowest absorption was only 1.5%, an improvement of 500% over the lowest value of the prior art materials. To demonstrate the effect of various fatty oils combined with different agents, compositions number 3 and 4 employ the soya bean oil resin, and compositions 5 and 6 employ the cotton seed oil resin. Compositions 3 and 5 are hardened with a 37% solution of formaldehyde in commercial isopropyl alcohol, and compositions 4 and 6 are hardened with dimethylol ethylene diamine. The results in the table indicate the cotton seed oil-resorcinol resin base coatings to be somewhat more effective as moisture vapor barriers than those produced using soya bean oil.

Because of the excellent moisture resistance of the cured coating composition, it may be employed as an undercoat on wood surfaces prior to the flame spraying of those surfaces with metal powders. It is well known that many attempts have been made to flame spray metallic coatings on wood surfaces without success because the alternating swelling and shrinkage of the wood beneath fractures the metal film which promptly peels off because of lack of adhesion. However, when the wood to be flame sprayed with metal is first sprayed with the coating composition of the present invention, and while it is still in a tacky state, it may be flame sprayed with powdered metal, as for example, powdered zinc, and the heat from the powdered metal striking the surface will cure the resin coating composition, at the same time bonding it to the flame sprayed metal surface resulting in a permanently bonded metal surface to a piece of stabilized wood, that is, stabilized as far as shrinking and swelling because of moisture absorption is concerned.

The coatings of the present invention may also be employed as prime and sealer coats on wooden doors and sashes to prevent dimensional change thus permitting the factory fitting of sash and doors to their frames. The coatings may also be applied to other types of surfaces, as for example, metals, plastics, fabrics both synthetic and natural, rubbers both synthetic and natural, and the like.

Another outstanding application for the coatings in view of their extreme moisture resistance and alkali resistance is as sealer coats on concrete walls and floors, machinery, partitions, plastered surfaces and the like.

It is desired to point out that the special difunctional converting-setting agents such as the methylol ethylene diamines employed in the present invention are highly effective in lowering the curing temperature and increasing the speed of the curing reaction of phenolic resins such as phenol-aldehyde, resorcinol-aldehyde, phloroglucinol-aldehyde, cresol-aldehyde, and similar permanently fusible resins as well as copolymer resins such as phenol-resorcinol-aldehyde; cresol-resorcinol-aldehyde resins, and the like.

In carrying out the present invention the resinous condensation product of the phenolic body and the hereindescribed unsaturated fatty acid or unsaturated oil may be dissolved in any solvent for said resinous composition which is nonreactive with the resinous mass, that is, the solvent should be substantially inert with respect to the reaction product of the phenolic body and the unsaturated fatty acid or oil. In general, the solvents which may be employed are the aliphatic or aromatic hydrocarbon solvents typified by benzene, toluene, n-heptane, xylene; the alcohols and especially the commercial lower aliphatic alcohols having up to eight carbon atoms in a molecule, as for example, methyl alcohol, ethyl alcohol, butyl alcohol, and isopropyl alcohol. The higher alcohols may be used, but the best results are obtained with the lower alcohols. The ketones may also be used as solvents, examples thereof being acetone, methyl ethyl ketone and methyl isopropyl ketone. There also may be used as solvents the cyclo-aliphatic alcohols, as for example cyclohexanol, and cyclic aliphatic ketones, such as cyclohexanone. The chlorinated aliphatic or the chlorinated aromatic hydrocarbons may be used as solvents for the resinous condensation product herein set forth. Examples of said chlorinated compounds are carbon tetrachloride, chloroform, ethylene dichloride, chlorobenzene and others. Other solvents which may be used are the nitro derivatives of aromatic and aliphatic hydrocarbons, as for example, nitromethane, nitroethane, nitropropane, and nitrobenzene.

By the term "aldehydic liberating setting agent" as herein employed is meant a compound which when employed as a setting agent liberates either the free aldehyde or the alkylene radical contained in the aldehyde. For example, a solution of formaldehyde in ethyl alcohol supplies free formaldehyde whereas dimethylol ethylene diamine supplies the methylene radical when each of these materials is respectively used as a setting agent. In either case the setting agent eventually supplies an alkylene bridge between resorcinol or other phenolic groups contained in the resin composition to effect thermosetting.

It is desired to point out that in addition to the organic amines herein set forth as alkylene converting agents, inorganic alkaline or basic substances may be used, as for example, sodium hydroxide, ammonium hydroxide, potassium hydroxide, lithium hydroxide, sodium carbonate, and the like.

When an acid converting agent is used, any of the prior art acids or compounds generating acids may be used for the purpose of converting the condensation product of the phenolic body and the unsaturated oil or unsaturated fatty acid to an acid state wherein the compound will cold set within 24 hours in the presence of a sufficient quantity of a setting agent to a non-tacky, dry, insoluble, infusible state.

The primary and secondary amines which are reacted with an aldehyde contain what is known as active hydrogen atoms. This distinguishes the primary and secondary amines from the tertiary amines. When the mono or di-alkylamines are reacted with formaldehyde, there are produced what is known as methylol-amines which may also be designated alkylaminomethanols.

As previously indicated, the diamines such as ethylene diamine and trimethylenediamine react with aldhydes, as for example formaldehyde, to produce condensation products which are relatively high boiling liquids.

Instead of employing the organic amines as the converting agent or using the organic amines for condensation with an aldehyde to produce a setting agent or a bi-functional converting and setting agent, derivatives of the amines may be employed such as chloro derivatives, nitro derivatives, alkyl derivatives, aryl derivatives, and the like.

In connection with the production of the bi-functional converting and setting agents resulting from the reaction of amines and aldehydes, it is desired to point out that for each reactive amine hydrogen present in the amine molecule, there may be combined one mol of formaldehyde. For example, employing tetraethylenepentamine, there may be combined from 1 to 7 mols of formaldehyde with one mol of the tetraethylenepentamine.

I claim:

1. The method of producing a non-siccative room temperature setting resinous product comprising heat-reacting a phenolic body and a material selected from the group consisting of unsaturated fatty oils and fatty acids having 12 to 32 carbon atoms in a molecule thereof in the presence of an acid catalyst, said phenolic body being selected from the group consisting of monohydric, dihydric and trihydric phenols which have at least two reactive positions on the nucleus unsubstituted, the hydroxy groups of the dihydric and trihydric phenols being on the same carbon ring, the molar ratio of the phenolic body to the fatty material varying from 1:3 to 3:1, forming thereof a cold-setting non-neutral solution of a permanently fusible resinous reaction product in an organic solvent which is substantially inert with respect to said reaction product, said solution of the resinous reaction product because of its non-neutrality being capable of cold-setting upon the addition of a setting agent at a temperature between 40° and 120° F., treating said solution just prior to its use with 2% to 20% of a setting agent comprising the reaction product of an amine selected from the group of amines consisting of primary and secondary saturated aliphatic hydrocarbon amines, and an aldehyde in which the aldehyde group is the sole reactive group, the molar ratio of the aldehyde to the amine varying from 1 mol of aldehyde to 4 mols of the aldehyde for each mol of the amine, the resulting amine addition product being reactive to set the resinous reaction product within the cold-setting temperature range, said percentage of setting agent being taken on the resinous solids present in the resin solution, said amine-aldehyde addition product setting and hardening the permanently fusible resinous mass and cold-setting the resinous mass at a temperature varying between 40° and 120° F. to a non-tacky dry state.

2. The method of producing a non-siccative room temperature setting resinous product comprising heat-reacting a phenolic body and a material selected from the group consisting of unsaturated fatty oils and fatty acids having 12 to 32 carbon atoms in a molecule thereof in the presence of an acid catalyst having a dissociation constant greater than $1 \times 10^{-3}$, said phenolic body being selected from the group consisting of monohydric, dihydric and trihydric phenols which have at least two reactive positions on the nucleus unsubstituted, the hydroxy groups of the dihydric and trihydric phenols being on the same carbon ring, the molar ratio of the phenolic body to said fatty material varying from 1:3 to 3:1, forming thereof a cold-setting non-neutral solution of a permanently fusible resinous reaction product in an organic solvent which is substantially inert with respect to said reaction product, said solution of the resinous reaction product because of its non-neutrality being capable of cold-setting upon addition of a setting agent at a temperature between 40° and 120° F., treating said solution just prior to its use with 2% to 20% of a setting agent comprising the reaction product of an amine selected from the group of amines consisting of primary and secondary saturated aliphatic hydrocarbon amines, and an aldehyde in which the aldehyde group is the sole reactive group, the molar ratio of the aldehyde to the amine varying from 1 mol of aldehyde to 4 mols of the aldehyde for each mol of the amine, the resulting amine addition product being reactive to set the resinous reaction product within the cold-setting temperature range, said percentage of setting agent being taken on the resinous solids present in the resin solution, said amine-aldehyde addition product setting and hardening the permanently fusible resinous mass and cold-setting the resinous mass at a temperature varying between 40° and 120° F. to a non-tacky dry state.

3. The method of producing a non-siccative room temperature setting resinous product comprising heat-reacting a phenolic body and a material selected from the group consisting of unsaturated fatty oils and fatty acids having 12 to 32 carbon atoms in a molecule thereof in the presence of a sulfuric acid catalyst, said phenolic body being selected from the group consisting of monohydric, dihydric and trihydric phenols which have at least two reactive positions on the nucleus unsubstituted, the hydroxy groups of the dihydric and trihydric phenols being on the same carbon ring, the molar ratio of the phenolic body to said fatty material varying from 1:3 to 3:1, forming thereof a cold-setting non-neutral solution of a permanently fusible resinous reaction product in an organic solvent which is substantially inert with respect to said reaction product, said solution of the resinous reaction product because of its non-neutrality being capable of cold-setting upon the addition of a setting agent at a temperature between 40° and 120° F., treating said solution just prior to its use with 2% to 20% of a setting agent comprising the reaction product of an amine selected from the group of amines consisting of primary and secondary saturated aliphatic hydrocarbon amines, and an aldehyde in which the aldehyde group is the sole reactive group, the molar ratio of the aldehyde to the amine varying from 1 mol of aldehyde to 4 mols of the aldehyde for each mol of the amine, the resulting amine addition product being reactive to set the resinous reaction product within the cold-setting temperature range, said percentage of setting agent being taken on the resinous solids present in the resin solution, said amine-aldehyde addition product setting and hardening the permanently fusible resinous mass and cold-setting the resinous mass at a temperature varying between 40° and 120° F. to a non-tacky dry state.

4. The method of claim 1 in which the setting is effected within a time period of 12 hours.

5. The method of claim 1 in which the setting agent is an alkylene amine-aldehyde reaction product.

6. The method of claim 1 in which the setting agent is an ethylene amine-aldehyde reaction product.

7. The method of claim 1 in which the phenol is a dihydroxy benzene.

8. The method of claim 1 in which the phenol is resorcinol.

9. The method of claim 1 in which the amine-aldehyde reaction product has a vapor pressure below 0.5 mm. at 20° C.

10. The method of producing a non-siccative room temperature setting resinous product comprising heat-reacting a phenolic body and a material selected from the group consisting of unsaturated fatty oils and fatty acids having 12 to 32 carbon atoms in a molecule thereof in the presence of an acid catalyst having a dissociation constant greater than $1 \times 10^{-3}$, said phenolic body being selected from the group consisting of monohydric, dihydric and trihydric phenols which have at least two reactive positions on the nucleus unsubstituted, the hydroxy groups of the dihydric and trihydric phenols being on the same carbon ring, the molar ratio of the phenolic body to said fatty material varying from 1:3 to 3:1, forming thereof a non-neutral cold-setting solution of a permanently fusible resinous reaction product in an organic solvent which is substantially inert with respect to said reaction product, said solution of the resinous reaction product because of its non-neutrality being capable of cold-setting upon addition of a setting agent at a temperature between 40° and 120° F., treating said solution prior to its use with 2 to 20% of an aldehydic setting agent reactive to harden and set the resinous mass at a temperature varying between 40° and 120° F., said aldehydic setting agent furnishing as its sole reactive setting group an alkylene bridge between the phenolic groups present in the resinous reaction product, the molar ratio of the aldehydic setting agent to the phenolic body being at least 0.8 to 1, and cold-setting the resulting mass at a temperature varying between 60° F. and 120° F., and within a period of 12 hours to a non-tacky dry state.

11. The method of claim 10 in which the phenolic body is resorcinol.

12. A non-siccative resinous product capable of setting at a temperature varying between 40° and 120° F., comprising a mixture of (a) a cold-setting solution formed by dissolving in a solvent the resinous heat-reacted reaction product of a reactive phenolic body and a material selected from the group consisting of unsaturated fatty oils and fatty acids having 12 to 32 carbon atoms in a molecule thereof and an acid catalyst, said phenolic body being selected from the group consisting of monohydric, dihydric and trihydric phenols which have at least two reactive positions on the nucleus unsubstituted, the hydroxy groups of the dihydric and trihydric phenols being on the same carbon ring, the molar ratio of the phenolic body to said fatty reacting material varying from 1:3 to 3:1, said reaction product being permanently fusible, said solvent being substantially inert with respect to said reaction product, and (b) a setting agent comprising the reaction product of an amine selected from the group of amines consisting of primary and secondary saturated aliphatic hydrocarbon amines, and an aldehyde in which the aldehyde group is the sole reactive group, the molar ratio of the aldehyde to said amine varying from 1 mol of the aldehyde to 4 mols of the aldehyde for each mol of the amine, said setting agent being reactive to set at a temperature between 40° F. and 120° F.

13. The resinous composition of claim 12 in which the phenol is resorcinol.

14. The resinous composition of claim 12 in which the setting agent is the reaction product of ethylene diamine and an aldehyde.

15. The resinous composition of claim 12 in which the setting agent is the reaction product of ethylene diamine and formaldehyde.

16. The resinous composition of claim 12 in which the fatty material is soya bean oil.

17. The method of claim 1 in which the phenolic body is resorcinol, the catalyst is a sulfuric acid catalyst, and the setting agent is an alkylene amine-aldehyde reaction product.

18. The method of claim 1 in which there is produced a copolymer resinous product and in which the phenolic body is a mixture of phenol per se and resorcinol, the catalyst is sulfuric acid and the setting agent is an alkylene amine-aldehyde reaction product.

19. The method of producing a resinous product comprising heat-reacting a phenolic body and material selected from the group consisting of unsaturated fatty oils and fatty acids having 12 to 32 carbon atoms in a molecule thereof in the presence of an acid catalyst, said phenolic body being selected from the group consisting of monohydric, dihydric, and trihydric phenols which have at least two reactive positions on the nucleus unsubstituted, the hydroxy groups of the dihydric and trihydric phenols being on the same carbon ring, the molar ratio of the phenolic body to the fatty material varying from 1:3 to 3:1, treating the resulting permanently fusible condensation product with 2 to 20% of setting agent, said percentage being taken on the weight of the resin, said setting agent comprising the reaction product of an amine selected from the group of amines consisting of primary and secondary saturated aliphatic hydrocarbon amines, and an aldehyde in which the aldehyde group is the sole reactive group, the molar ratio of the aldehyde to the amine varying between 1 mol of aldehyde and 4 mols of the aldehyde for each mol of the amine.

20. The method of producing a resinous product comprising heat-reacting a phenolic body and material selected from the group consisting of unsaturated fatty oils and fatty acids having 12 to 32 carbon atoms in a molecule thereof in the presence of an acid catalyst, said phenolic body being selected from the group consisting of monohydric, dihydric, and trihydric phenols which have at least two reactive positions on the nucleus unsubstituted, the hydroxy groups of the dihydric and trihydric phenols being on the same carbon ring, the molar ratio of the phenolic body to the fatty material varying from 1:3 to 3:1, treating the resulting permanently fusible condensation product with an amine selected from the group of amines consisting of primary and secondary saturated aliphatic hydrocarbon amines, in an amount to neutralize the residual acidity of the resinous reaction product and to convert the latter to the state where it is capable of cold-setting in the presence of a setting agent, mixing therewith an aldehyde having setting properties in which the aldehyde is the sole reactive group, and setting and hardening the resultant resinous mass at a temperature between 40° and 120° F. to a non-tacky state.

21. The method of claim 20 in which the phenolic body is resorcinol.

PHILIP H. RHODES.

REFERENCES CITED

The following references are of record in the file of this patent:

UNITED STATES PATENTS

| Number | Name | Date |
| --- | --- | --- |
| 2,044,969 | Byck | June 23, 1936 |
| 2,059,260 | Long | Nov. 3, 1936 |
| 2,137,242 | Ellis | Nov. 22, 1938 |
| 2,154,969 | Bender | Apr. 19, 1939 |
| 2,414,417 | Norton | Jan. 14, 1947 |